United States Patent [19]
Grey

[11] 3,769,792
[45] Nov. 6, 1973

[54] CONTROL SYSTEM FOR A TURBINE ENGINE

[76] Inventor: Jerry Grey, 359 W. 21st St., New York, N.Y. 10011

[22] Filed: Mar. 21, 1972

[21] Appl. No.: 236,605

Related U.S. Application Data

[62] Division of Ser. No. 862,247, Sept. 30, 1969, Pat. No. 3,665,763.

[52] U.S. Cl. ......... 60/39.28 T, 73/190 R, 73/339 R
[51] Int. Cl. ................................................. F02c 9/08
[58] Field of Search ............................. 60/39.28 T; 73/190 R

[56] References Cited
UNITED STATES PATENTS

| | | | |
|---|---|---|---|
| 3,651,639 | 3/1972 | Black | 60/39.28 T |
| 2,606,420 | 8/1952 | Moore | 60/39.28 T |
| 2,610,466 | 9/1952 | Ballantyne | 60/39.28 T |
| 2,790,120 | 4/1957 | Ducoff | 60/39.28 T |
| 3,017,749 | 1/1962 | Heppler | 60/39.28 T |
| 3,167,956 | 2/1965 | Grey | 73/190 R |
| 3,453,880 | 7/1969 | Dropkin | 73/339 R |

*Primary Examiner*—Clarence R. Gordon
*Attorney*—Thomas B. Van Poole et al.

[57] ABSTRACT

A probe for diagnosing the properties of a high temperature gas including a body having a first fluid passageway for receiving a gas sample therethrough, the body having a second fluid passageway for circulating a coolant therethrough in heat transfer relation with the gas sample flowing through the first fluid passageway, the body having a third fluid passageway disposed between the second fluid passageway and the environment of the body for thermally insulating coolant flowing in the second fluid passageway, from the environment of the body, the passageways having means for providing fixed flow rate ratios, and means for measuring the temperature rise of the coolant flowing in the second fluid passageway.

14 Claims, 4 Drawing Figures

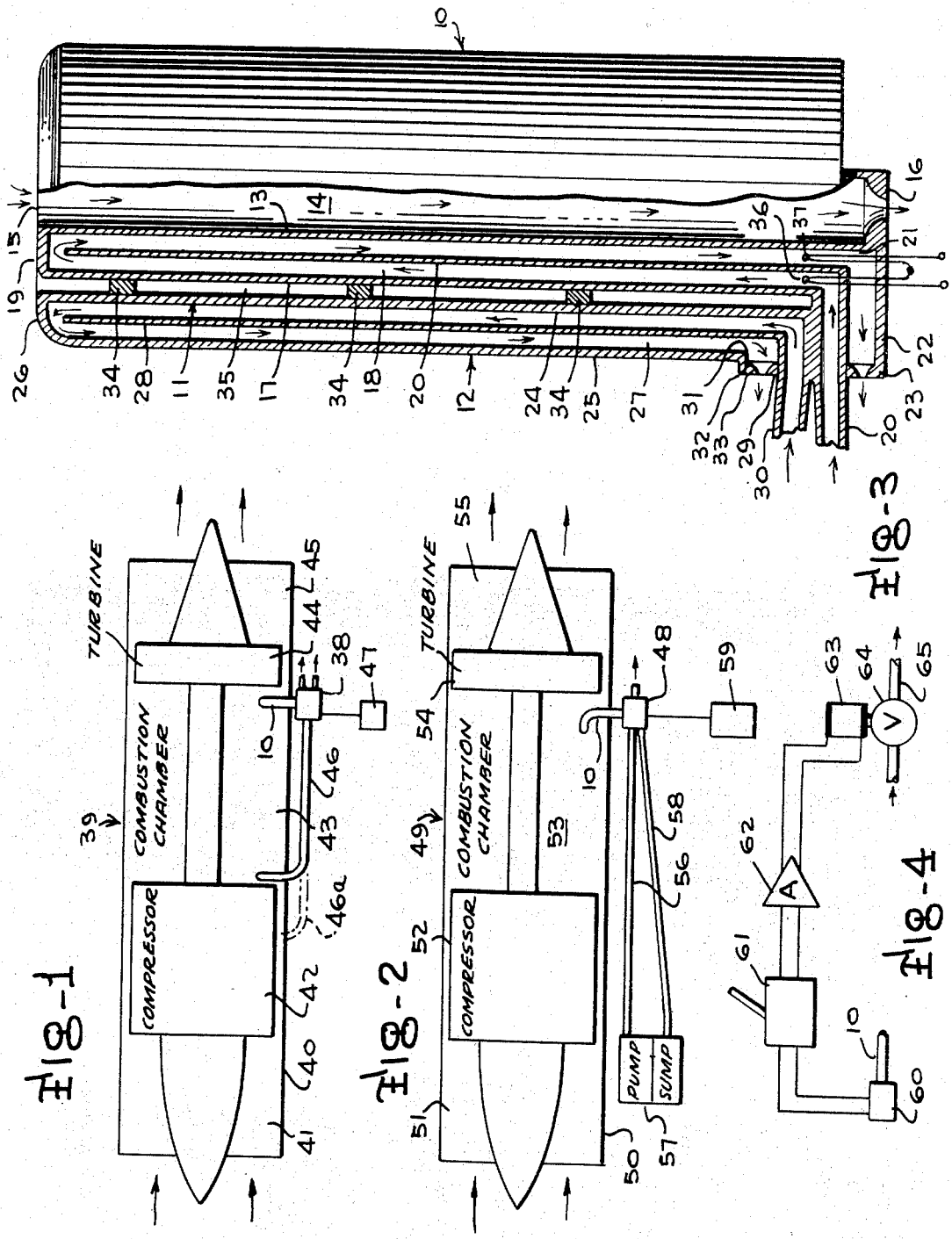

CONTROL SYSTEM FOR A TURBINE ENGINE

This is a division of application, Ser. No. 862,247 filed Sept. 30, 1969 now U.S. Pat. No. 3,665,763.

This invention relates to a device for diagnosing the properties of high temperature gases and more particularly to a calorimetric probe for diagnosing the properties of gases in the temperature range of 3,000° to over 30,000° F. This invention further contemplates a novel device for measuring the properties of high temperature gases, and a novel control system for combustion engines having operating temperatures in excess of 3,000° F.

In aerospace and several other fields, the temperatures at which measurements must be made in gases and plasmas have reached levels too high for reliable operation of conventional temperature measuring devices. The resulting demand for a more satisfactory high temperature instrument has led to the development of a family of advanced cooled probes that are applicable to high-pressure arc jets, hypothermal wind tunnels, rocket motors, scramjets, and similar severe environments, and which can be used to determine enthalpy, temperature, various pressures, gas velocity and composition, degree of nonequilibrium, electron and ion temperatures and densities, and the like.

Cooled high temperature probes differ considerably, depending on the specific measurement and environmental conditions for which they are intended. Particularly significant are the enthalpy-measuring types which are all based on the principles of calorimetry, wherein the heat removed by the probe coolant is used to find the energy or enthalpy of a measured quantity of a particular gas under observation. Every probe of this kind extracts a sample of the gas under investigation. From measurements of the mass flow of the aspirated sample and of the energy taken from it by the coolant, the enthalpy of the sample can be determined directly. (With most designs of such probes, a tare measurement must be made to differentiate the energy drawn off to cool the probe's exterior from that used to cool the gas sample itself.) Simultaneously, the composition of the cooled gas sample can be established downstream by some analythical instrument such as a chromatograph. The impact pressure of the gas can be measured by briefly shutting off the sample flow through the probe. An example of such a cooled calorimetric probe' and a method of measuring the properties of high temperature gases with such a probe is described in U.S. Pat. No. 3,167,956 issued Feb. 2, 1965.

The present invention provides an improved calorimetric probe for diagnosing and measuring the temperature and product of temperature and mass flow rate of gas streams having temperatures in the range of 3,000° and in excess of 30,000° F. Without the requirement of a tare measurement. The invention further provides a control system in which such a probe is utilized, for turbojet engines wherein the turbine inlet temperature or the product of engine mass flow rate and turbine inlet temperature can be controlled directly without additional signal manipulation. In conventional systems for controlling either turbine inlet temperature or the product of engine mass flow rate and turbine inlet temperature, three separate devices have been required to measure pressure, flow and temperature, and a complex computer has been required to provide the control signal. In addition in such conventional systems, thermocouples used for measuring temperature have not been capable of measuring the high temperatures at the turbine inlet of such engines, where it is necessary to make the temperature measurement for control purposes.

Accordingly, it is the principal object of the present invention to provide a novel probe for diagnosing the properties of high temperature gases.

Another object of the present invention is to provide a novel probe for diagnosing the properties of gases in the temperature range of 3,000° to over 30,000° F.

A further object of the present invention is to provide a novel calorimetric probe.

A still further object of the present invention is to provide a device for measuring the properties of high temperature gases.

Another object of the present invention is to provide a novel device for measuring the properties of gases having temperatures in the range of 3,000° to over 30,000° F.

A further object of the present invention is to provide a device for measuring the properties of high temperature gases utilizing a novel calorimetric probe.

A still further object of the present invention is to provide a novel device for measuring the temperature and product of temperature and mass flow rate of a high temperature gas.

Another object of the present invention is to provide a novel device for measuring the properties of high temperature gases, utilizing a calorimetric probe which eliminates the necessity of a tare measurement.

A still further object of the present invention is to provide a novel system for a combustion engine such as a turbojet engine.

Another object of the present invention is to provide a novel control system for a combustion engine having operating temperatures in the range of 3,000° to over 30,000° F.

A further object of the present invention is to provide a novel control system for a turbojet engine, wherein either the turbine inlet temperature or the product of engine mass flow rate and turbine inlet temperature can be controlled directly without additional signal manipulation.

A still further object of the present invention is to provide a novel control system for a turbojet engine which eliminates the need for separate devices for measuring pressure, flow and temperature, and a complex computer for providing a resultant control signal.

Another object of the present invention is to provide a novel probe for diagnosing the properties of high temperature gases which will withstand continuous immersion in severe environments.

A further object of the present invention is to provide a novel device for measuring the properties of high temperature gases, which is simple in construction, comparatively inexpensive to manufacture, and capable of continuous accurate operation.

A still further object of the present invention is to provide a novel control system for combustion engines, which is comparatively simple in construction, relatively inexpensive to manufacture, and which requires minimum servicing.

Other objects and advantages of the present invention will become more apparent to those persons skilled in the art to which the present invention relates, from the following description taken in conjunction with the accompanying drawing, wherein:

FIG. 1 illustrates an embodiment of the invention being utilized to diagnose the turbine inlet temperature of a turbojet engine;

FIG. 2 is another embodiment of the invention, being utilized to measure the product of turbine inlet temperature and engine air mass flow rate of a turbojet engine;

FIG. 3 is an enlarged elevation view of the novel probe utilized in the embodiments of the invention illustrated in FIGS. 1 and 2; and FIG. 4 is a diagrammatic schematic view of another embodiment of the invention, consisting of a control system utilizing a probe as illustrated in FIG. 3.

Briefly described, the present invention relates to a novel probe for diagnosing the properties of a high temperature gas, generally including a body having a first fluid passageway for receiving a gas sample therethrough, the body having a second fluid passageway for conducting a coolant therethrough in heat transfer relation to the gas sample flowing through the first fluid passageway, the passageways having means for providing fixed flow rate ratios, means for thermally insulating the coolant flowing in the second fluid passageway from the environment of the body, and means for measuring the temperature rise of the coolant flowing through the second fluid passageway.

In the preferred embodiment of the invention, the means for thermally insulating the coolant flowing in the second fluid passageway from the environment of the body consists of a third fluid passageway disposed between the second fluid passageway and the environment of the body, which is thermally insulated from the second fluid passageway. In addition, the first fluid passageway is elongated, having a gas inlet at one end thereof, the second fluid passageway is annular, and encompasses the first fluid passageway, the third fluid passageway is annular and encompasses the second fluid passageway in spaced relation, the thicknesses of the annuli of the second and third fluid passageways are of selected values whereby the wall temperatures at corresponding points along the second and third fluid passageways are equal, the means for providing fixed flow rate ratios in the fluid passageway comprise orifices, and the means for measuring the temperature rise of the coolant in the second fluid passageway comprise thermocouples disposed in the inlet and outlet of the second fluid passageway.

Referring to FIG. 3, there is illustrated an embodiment of the invention, consisting of a probe body 10 having an inner elongated, annular jacket 11, and an outer elongated, annular jacket 12. The inner jacket 11 includes an inner cylindrical wall 13 defining a gas sample passageway 14 having an inlet 15 at the forward end thereof and a choked orifice 16 at the rearward end thereof which may communicate with the ambient atmosphere, a discharge line or line conducting the aspirated gas sample to other instrumentation for measuring additional properties of the gas, and an outer cylindrical wall 17 providing an annular fluid passageway 18. The annular fluid passageway 18 is provided with a front wall 19 and a cylindrical partition wall 20 which terminates at its forward end rearwardly from the front wall 19 of the fluid passageway 18. The outer portion of the fluid passageway 18 is provided with an inlet communicating with a fluid supply line 20 and the inner portion of the fluid passageway 18 is provided with an outlet 21 communicating with a fluid return line 22, having a choked orifice 23.

The outer jacket 12 is similar in construction to the inner jacket 11 and includes an inner cylindrical wall 24, an outer cylindrical wall 25 and a front end wall 26 defining a fluid passageway 27. The fluid passageway 27 is provided with a cylindrical partition wall 28 which terminates at its forward end rearwardly of the front end wall 26. The inner portion of the fluid passageway 27 is provided with an inlet 29 communicating with a fluid supply line 30, and the outer portion of the fluid passageway 27 is provided with an outlet 31 communicating with a fluid return line 32 being provided with a choked orifice 33.

It thus will be seen that fluid supplied through line 20 will flow through the inlet and the outer portion of fluid passageway 18, around the forwardly disposed end of the partition wall 20, and through the inner portion of the fluid passageway 18, the outlet 21 and the choked orifice 23. Fluid introduced through the fluid supply line 30 will flow through the inlet 29 and the inner portion of fluid passageway 27, around the forwardly disposed end of partition wall 28, and through the outer portion of the fluid passageway 27, the outlet 31, and the choked orifice 32.

The function of the fluid passageway 14 is to receive and conduct therethrough a sample of the high temperature gas under observation. The inner jacket 11 is disposed adjacent the fluid passageway 14, so that a coolant flowing through the fluid passageway 18 will be in heat transfer relation with the gas sample flowing through the fluid passageway 14. The function of the outer jacket 12 is to thermally insulate the inner jacket 11 from the high temperature gaseous environment in which the probe is inserted. For ideal operating conditions of the probe, the temperatures of corresponding points of the walls 17 and 24 of the inner and outer jackets should be equal along the entire lengths thereof. To assure such conditions, the outer wall 17 of the jacket 11 and the inner wall 24 of the outer jacket 12 are radially spaced by a plurality of spacers 34, providing an annular air gap 35 between the inner and outer jackets. In addition, in the design of the probe body, the thicknesses of the fluid passageways 18 and 27 are fixed, so that at some easily achieved reference condition, the temperatures at corresponding points all along the opposed cylindrical walls 17 and 24 are equal. The insulating space 35 between the inner and outer jackets may either be an air gap or a vacuum chamber. Futhermore, for the proper operation of the embodiment, the choked orifices 16, 23 and 33 are provided to provide fixed flow rate ratios of the fluid flows in the passageways 14, 18 and 27.

The inlet 20 and the outlet 21 of the fluid passageway 18 are provided with thermocouples 36 and 37 which generate a millivolt-level output signal, a function of the temperature rise of a coolant circulated through the fluid passageway 18 of the inner jacket 11. The lead wires for the thermocouples 36 and 37 are connected to a voltage divider circuit to provide an output signal $\sigma$ which will be discussed subsequently.

FIG. 1 illustrates a device 38 for measuring the turbine inlet temperature of a turbojet engine 39. The engine includes a conventional cowling 40 which houses a diffuser chamber 41, a compressor 42, a combustion chamber 43, a turbine 44 which drives the compressor, and an exhaust nozzle 45. The measuring device 38 includes a probe 10 having the gas sample inlet 15 thereof positioned in the outlet of the combustion chamber or the inlet of the turbine, a pair of coolant supply lines 46 (the second line being hidden in the drawing) having the inlet ends thereof positioned at the compressor outlet and being operatively connected to the fluid supply lines 20 and 30 to provide a continuous flow of air coolant in the fluid passageways 18 and 27 of the probe, and a voltage divider circuit 47 including the lead wires from the thermocouples 36 and 37 positioned in the inlet and outlet of the fluid passageway 18 in the probe. As illustrated by the phantom lines 46a in FIG. 1, the inlet of the coolant supply lines 46a may be positioned forward of the compressor outlet. The measuring device 38 utilizing the probe 10 and mounted on a turbojet engine 39, as illustrated in FIG. 1, can be utilized to measure the turbine inlet temperature of the engine, as will later be described.

The embodiment illustrated in FIG. 2 consists of a modification of the embodiment shown in FIG. 1. The embodiment of FIG. 2 consists of a device 48 for measuring the turbine inlet temperature and the product of mass flow rate and turbine inlet temperature of a turbojet engine 49. Similar to the engine illustrated in FIG. 1, the engine 49 includes a conventional cowling 50 which houses a diffuser chamber 51, a compressor 52, a combustion chamber 53, a turbine 54 which drives the compressor, and an exhaust nozzle 55. The measuring device 48 includes a probe 10 having the gas sample inlet 15 thereof positioned in the outlet of the combustion chamber or the inlet of the turbine, a pair of coolant supply lines 56 interconnecting a pump 57 and the fluid supply lines 20 and 30 which provide a continuous flow of coolant consisting of fuel, oil, a hydraulic fluid or any other suitable coolant fluid in the fluid passageways 18 and 27 of the probe, a return line 58 interconnecting the probe body and the sump for the pump, and a read-out instrument 59 connected to the lead wires from the thermocouples 36 and 37 positioned in the inlet and outlet of the fluid passageway 18 in the probe. Where a closed coolant supply system as illustrated in FIG. 2 is employed, the inlet temperature and flow rate of the coolant flowing in the fluid passageway 18 may be maintained constant so that the measuring device 48 can be utilized to measure the product of turbine inlet temperature and engine air mass flow rate, as will later be described.

As previously mentioned, the gas sample inlet 15 of the probe 10 may be positioned either at the combustion chamber outlet or the turbine inlet, where the operating temperatures of the engine are highest. In addition, it is to be noted that the probe may be inserted in such regions in the form as illustrated in FIGS. 1 and 3, or the probe may be formed with a 90° bend so that the inlet 15 thereof faces upstream in the engine, as shown in FIG. 2.

The device 38 illustrated in FIG. 1 may be utilized to measure the turbine inlet temperature in view of the following analysis. Since the mass flow rate through the engine is limited by the choked nozzle (i.e., the local Mach number is a function of area only), the mass flow rate at any actual location inside the engine, at any speed is given by $$w_a = A_a P_{t_a} / \sqrt{T_{t_a}} f(M_a, R_a, \gamma_a)$$

where
$A_a$ = area of air flow, sq. ft.
$P_{t_a}$ = total pressure of air flow, lb./ft.$^2$
$T_{t_a}$ = total temperature of air flow, °R
$M_a$ = Mach number of air flow
$R_a$ = gas constant, ft-lb./lb-°F
$\gamma$ = ratio of specific heats
and where $A_a$ and $f(M_a, R_a, \gamma a)$ are constants at any one location.

But the gas mass flow rate through a choked orifice is also given by $$w_p = A_p P_{t_p} / \sqrt{T_{t_p}} f(M_p, R_p, \gamma_p)$$

where $A_p$ and $f(M_p, R_p, \gamma_p)$ are also constants.

Thus, the ratio of mass flow through a choked probe to that in the engine at the probe's location is constant, since the probe obviously encounters the same total pressure and total temperature as those which exist at the engine location.

As a corollary of the above, therefore, the ratio of mass flows through a choked probe located at the compressor discharge ($c$) to one located at the turbine inlet ($d$) will be $$w_d / w_c = (1+\mu)k$$

where $\mu$ = fuel/air ratio and $k$ = constant.

An energy balance across the calorimetric probe jacket may then be written, assuming the calorimetric probe coolant is not heated by the turbine inlet conditions exterior to the probe, as $$w_c c_{p_c}(T_{c_{out}} - T_{c_{in}}) = w_d c_{p_d}(T_{d_{in}} - T_{d_{out}})$$

where
$w_c$ = mass flow rate of air from compressor discharge through passage 18, lb/sec
$c_{p_c}$ = specific heat at constant pressure of air at compressor discharge, lb/sec
$T_{c_{out}}$ = probe coolant outlet temperature as measured by thermocouple 37, °R or °F
$T_{c_{in}}$ = probe coolant inlet temperature, as measured by thermocouple 36, °R or °F
$c_{p_d}$ = specific heat at constant pressure of combustion gas at turbine inlet, lb/sec
$T_{d_{in}}$ = probe inlet temperature to passage 14, located at turbine inlet, °R or °F
$T_{d_{out}}$ = probe outlet temperature from passage 14, located at turbine inlet, °R or °F
and where $T_{c_{in}} \neq T_{t_3}$ (total temperature of compressor discharge) due to transmission-line heat transfer; $T_{d_{in}} = T_{t_4}$ (total temperature of turbine inlet); and $T_{d_{out}} \approx T_{c_{out}}$, due to probe design (the final pass of coolant in passageway 18 is adjacent the passageway 14 for the gas sample).

The probe output signal $\sigma$ is proportioned to $(T_{c_{out}} - T_{c_{in}})$, so that $$\sigma \sim (T_{c_{out}} - T_{c_{in}}) = \frac{w_d}{w_c} \frac{c_{p_d}}{c_{p_c}} (T_{d_{in}} - T_{d_{out}})$$

(Note that, since $T_{d_{in}} (= T_{t_4})$ is generally much too high for convenient thermocouple measurement, it is necessary that $w_d/w_c \ll 1$, which is accomplished by making the coolant-passage area much larger than the gas sample area.)

Using the assumption $T_{d_{out}} \approx T_{c_{out}}$, $$(T_{c_{out}} - T_{c_{in}}) = \frac{w_d}{w_c} \frac{c_{p_d}}{c_{p_c}} [T_{d_{in}} - \{T_{c_{out}} - T_{c_{in}}\}]$$

$$- \frac{w_d}{w_c} \frac{c_{p_d}}{c_{p_c}} T_{c_{in}}$$

$$(T_{c_{out}} - T_{c_{in}}) = \frac{\frac{w_d}{w_c} \frac{c_{p_d}}{c_{p_c}} (T_{d_{in}} - T_{c_{in}})}{1 + \frac{w_d}{w_c} \frac{c_{p_d}}{c_{p_c}}}$$

If, now, we can assume that the ratio of specific heats $c_{p_d}/c_{p_c}$ does not change substantially during engine operation, then $$\frac{w_d}{w_c} \frac{c_{p_d}}{c_{p_c}} \approx k_1 (1 + \mu)$$

where $k_1$ = constant ($k_1 << 1$), as indicated above.

Since, now, $\mu << 1$,
$(T_{c_{out}} - T_{c_{in}}) = [k_1 (1 + \mu)]/[(1 + k_1) + k_1 \mu] (T_{d_{in}} - T_{c_{in}})$
$\approx (k_1/1 + k_1) \{1 + [1/(1 + k_1)]\} (T_{d_{in}} - T_{c_{in}})$ But, since $k_1 << 1$
$(T_{c_{out}} - T_{c_{in}}) \approx [k_1/(1 + k_1)] (1 + \mu) (T_{d_{in}} - T_{c_{in}})$ Thus, since $\sigma \sim (T_{c_{out}} - T_{c_{in}})$, the probe output signal is $$\sigma = k_2 (1 + \mu) (T_{d_{in}} - T_{c_{in}})$$

or $$T_{t_4} = T_{d_{in}} = T_{c_{in}} + \frac{\sigma}{k_2 (1 + \mu)}$$

where $k_2$ is a constant.

To measure $T_{t_4}$, therefore, it is necessary to use only the voltage divider circuit 47 to obtain the ratio $\sigma/k_2$ modified by a variable resistance proportionate to $\mu$, and added to the (low) probe coolant inlet temperature. The constant $k_2$ is set by calibration of the device $\mu$, by the fuel control position, and $T_{c_{in}}$ is a simple low-temperature thermocouple measurement.

Note that although the fuel/air ratio input is likely to be inaccurate (e.g., of the order of ± 5 percent), the total contribution of the $\mu$ term is only of the order of two or three percent, so that the probable error in $T_{t_4}$ due to this factor is only of the order of ¼ percent, or about 10°F in 3,500°F.

If the probe 10 is cooled by a fluid whose flow rate and inlet temperature are maintained constant, as in the device 48 illustrated in FIG. 2, the same energy balance may be written $$w_c c_{p_c} (T_{c_{out}} - T_{c_{in}}) = w_d c_{p_d} (T_{d_{out}} - T_{c_{out}})$$

$$= w_d c_{p_d} [T_{d_{out}} - (T_{c_{out}} - T_{c_{in}})]$$

$$- w_d c_{p_d} T_{c_{in}}$$

The output signal is, again $$(T_{c_{out}} - T_{c_{in}}) = \frac{\frac{w_d c_{p_d}}{w_c c_{p_c}} (T_{d_{out}} - T_{c_{in}})}{1 + \frac{w_d c_{p_d}}{w_c c_{p_c}}}$$

where, again, $w_d c_{p_d} \ll w_c c_{p_c}$, for the same reasons given previously.

Also, $w_d = k_{w_a}(1 + \mu)$ and $c_{p_d}$ may be taken constant over typical control ranges. Thus $$(T_{c_{out}} - T_{c_{in}}) \approx \frac{w_d c_{p_d}}{w_c c_{p_c}} 1 - \frac{w_d c_{p_d}}{w_c c_{p_c}} (T_{d_{out}} - T_{c_{in}})$$

Now, since $\frac{w_c c_{p_d}}{w_c c_{p_c}}$ is of the order of 0.02, we take a typical value $\epsilon$ in the middle of the control range, (i.e., at an average value of $w_d$), and thus, with little error, write, with $\epsilon$ = constant, and remembering that $T_{c_{in}} \ll T_{d_{out}}$ and is constant, $$(T_{c_{out}} - T_{c_{in}}) \approx \frac{w_d c_{p_d}}{w_c c_{p_c}} (1 - \epsilon)(T_{d_{out}} - T_{c_{in}})$$

or $$(T_{c_{out}} - T_{c_{in}}) \approx k_3 w_d (T_{d_{out}}) - T_{c_{in}} \epsilon$$

where $k_3$ is constant.

Thus, to good accuracy, $$w_d (T_{d_{out}}) \approx \frac{(T_{c_{out}} - T_{c_{in}})}{k_3} + \frac{\epsilon}{k_3} T_{c_{in}}$$

or $$w_a (T_{t_4}) \approx \frac{\sigma}{k_3 (1 + \mu)} + \frac{\epsilon T_{c_{in}}}{k_3 (1 + \mu)}$$

where again, if we pick a value $\mu$ in approximately the middle of the control range, $$w_a T_{t_4} \approx k_4 \sigma + k_5$$

where $k_4$ and $k_5$ are approximately constant. Thus, the product of mass flow rate and turbine inlet temperature is a linear function of the probe output which can be displayed on the read-out instrument 59.

The probe output signal $\sigma$ can be utilized to operate an electrically acutated mechanism to regulate the supply of fuel to the combustion chamber of an engine, as illustrated by the control system of FIG. 4. The control system consists of a measuring device 60 which may be similar to the previously described measuring devices 38 and 48, a conventional comparator 61, an amplifier 62 and a solenoid 63 which operates a valve 64 in the fuel supply line 65 for the engine. The inlet 15 of the probe 10 is positioned in the combustion chamber outlet or turbine inlet, as illustrated in FIGS. 1 and 2, and the probe functions to generate a millivolt-level output signal $\sigma$ which is a function of the turbine inlet temperature or the product of engine mass flow and turbine inlet temperature, as has been described previously. The output signal of the probe is fed to the comparator 61, in addition to the operator's input signal corresponding to adjustments in various operating conditions including power level, thrust, etc. The comparator emits an output signal which is amplified by the amplifier 62 to operate the valve stem positioning solenoid 63. It thus will be seen that the fuel supplied to the combustion chamber, by the control system illustrated in FIG. 4, will be a function of the temperature of the turbine inlet (or the product of mass flow rate and turbine temperature) as sensed by the probe 10 of the measuring device 60, and the adjustment input to the comparator by the operator. The engine is operated directly by means of a simple control system, thus eliminating elaborate sensing and measuring instruments requiring a complex computer to generate a command signal to the fuel supply system for the engine.

The probe 10 preferably is constructed of stainless steel or nickel although it also may be constructed of copper. The heat transfer requirements normally would dictate all of the design characteristics of the probe, including the passage dimensions which can be as small as 0.0015 inches, wall thicknesses which may be as small as 0.003 inches, and the fabrication methods, as well as the overall probe configuration.

From the foregoing detailed description, it will be evident that there are a number of changes, adaptations and modifications of the present invention which come within the province of those skilled in the art. However, it is intended that all such variations not departing from the spirit of the invention be considered as within the scope thereof as limited solely by the appended claims.

I claim:

1. A control system for a turbine engine including a compressor, a combustion chamber, a turbine and electrically actuated means for supplying fuel to said combustion chamber, comprising a probe disposable in a selected region of said engine including the combustion chamber outlet and the turbine inlet, said probe comprising a body having a first fluid passageway for receiving therethrough a gas sample from said selected region, said body having a second fluid passageway for conducting a coolant therethrough disposed in heat transfer relation to said gas sample flowing through said first fluid passageway, said passageways having means for providing a fixed flow rate ratio, and means for thermally insulating coolant flowing in said second fluid passageway from said selected region, means operatively connected to said probe for supplying coolant to said second fluid passageway, and an electrical supply circuit operatively connected to said electrically actuated means for supplying fuel to said combustion chamber, including means responsive to the temperature rise in said second fluid passageway of said probe body for correspondingly varying the voltage supplied to said electrically actuated means, thereby regulating the supply of fuel to said combustion chamber.

2. A control system for a turbine engine including a compressor, a combustion chamber, a turbine and electrically actuated means for supplying fuel to said combustion chamber according to claim 1, wherein said electrical supply circuit includes means for selectively varying the input signal for said electrically actuated means.

3. A control system for a turbine engine including a compressor, a combustion chamber, a turbine and electrically actuated means for supplying fuel to said combustion chamber according to claim 1, wherein said means operatively connected to said probe for supplying coolant to said second fluid passageway of said probe body is provided with an inlet disposed in a selected region of said engine including the inlet and outlet of said compressor for receiving gas under pressure as a coolant to be circulated through said second fluid passageway of said probe body.

4. A control system for a turbine engine including a compressor, a combustion chamber, a turbine and electrically actuated means for supplying fuel to said combustion chamber according to claim 1, wherein said means operatively connected to said probe for supplying coolant to said second fluid passageway of said probe body consists of a closed fluid circuit including a pump.

5. A control system for a turbine engine including a compressor, a combustion chamber, a turbine and electrically actuated means for supplying fuel to said combustion chamber according to claim 1, wherein said means responsive to the temperature rise in said second fluid passageway of said probe body comprises thermocouples disposed in the inlet and outlet of said second fluid passageway of said probe body.

6. A control system for a turbine engine including a compressor, a combustion chamber, a turbine and electrically actuated means for supplying fuel to said combustion chamber according to claim 1, wherein said means for providing a fixed flow rate ratio in said fluid passageways comprises orifices.

7. A control system for a turbine engine including a compressor, a combustion chamber, a turbine and electrically actuated means for supplying fuel to said combustion chamber, according to claim 1, wherein said first fluid passageway of said probe body is elongated, having a gas inlet at one end thereof, said second fluid passageway of said probe body is annular and encompasses said first fluid passageway thereof.

8. A control system for a turbine engine including a compressor, a combustion chamber, a turbine and electrically actuated means for supplying fuel to said combustion chamber, comprising a probe disposable in a selected region of said engine including the combustion chamber outlet and the turbine inlet, said probe comprising a body having a first fluid passageway for receiving therethrough a gas sample from said selected region, said body having a second fluid passageway for conducting a coolant therethrough in heat transfer relation to said gas sample flowing through said first fluid passageway, said body having a distinct third fluid passageway disposed between said second fluid passageway and said selected region for thermally insulating coolant flowing in said second fluid passageway from said selected region, said second and third fluid passageways being noncommunicable, said passageways having means for providing a fixed flow rate ratio therein, first means operatively connected to said probe for supplying coolant to said second fluid passageway of said probe body, second means operatively connected to said probe for supplying coolant to said third fluid passageway of said probe body, and an electrical supply circuit operatively connected to said electrically actuated means for supplying fuel to said combustion chamber, including means responsive to the temperature rise in said second fluid passageway of said probe body for correspondingly varying the voltage supplied to said electrically actuated means thereby regulating the supply of fuel to said combustion chamber.

9. A control system for a turbine engine including a compressor, a combustion chamber, a turbine and electrically actuated means for supplying fuel to said combustion chamber according to claim 8, when said electrical supply circuit includes means for selectively varying the input signal for said electrically actuated means.

10. A control system for a turbine engine including a compressor, a combustion chamber, a turbine and electrically actuated means for supplying fuel to said combustion chamber according to claim 8, when said means operatively connected to said probe for supplying coolant to said second and third fluid passageways of said probe body are provided with inlets disposed in a selected region of said engine including the inlet and outlet of said compressor for receiving gas under pressure as a coolant to be circulated through said second and third fluid passageways of said probe body.

11. A control system for a turbine engine including a compressor, a combustion chamber, a turbine and electrically actuated means for supplying fuel to said combustion chamber according to claim 8, wherein said means operatively connected to said probe for supplying coolant to said second and third fluid passageways of said probe body consist of a closed fluid circuit including a pump.

12. A control system for a turbine engine including a compressor, a combustion chamber, a turbine and electrically actuated means for supplying fuel to said combustion chamber according to claim 8, wherein said means responsive to the temperature rise in said second fluid passageway of said probe body comprises thermocouples disposed in the inlet and outlet of said second fluid passageway of said probe body.

13. A control system for a turbine engine including a compressor, a combustion chamber, a turbine and electrically actuated means for supplying fuel to said combustion chamber according to claim 8, wherein said means for providing a fixed flow rate ratio in said fluid passageways comprises orifices.

14. A control system for a turbine engine including a compressor, a combustion chamber, a turbine and electrically actuated means for supplying fuel to said combustion chamber, according to claim 8, wherein said first fluid passageway of said probe body is elongated, having a gas inlet at one end thereof, said second fluid passageway of said probe body is annular and encompasses said first fluid passageway thereof, and said third fluid passageway of said probe body is annular and encompasses said second fluid passageway in spaced relation.

* * * * *